United States Patent
Lutnick

(10) Patent No.: US 7,734,510 B2
(45) Date of Patent: *Jun. 8, 2010

(54) METHOD AND SYSTEM FOR PROVIDING A TRIAL OF A REFERRAL SERVICE TO A MERCHANT BASED ON A PLAN FOR EXPANSION

(75) Inventor: Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,461

(22) Filed: Feb. 9, 2007

(65) Prior Publication Data

US 2008/0195502 A1 Aug. 14, 2008

(51) Int. Cl.
*G06Q 30/00* (2006.01)
(52) U.S. Cl. .................................... 705/26
(58) Field of Classification Search ................ 705/26, 705/27
See application file for complete search history.

(56) References Cited

U.S. PATENT DOCUMENTS

| | | | | |
|---|---|---|---|---|
| 6,016,509 | A | * | 1/2000 | Dedrick ............... 709/224 |
| 6,832,240 | B1 | | 12/2004 | Dutta |
| 7,349,871 | B2 | | 3/2008 | Labrou et al. |
| 2001/0037403 | A1 | * | 11/2001 | Mougi et al. ............. 709/238 |
| 2002/0103700 | A1 | | 8/2002 | Gathy |
| 2003/0154135 | A1 | | 8/2003 | Covington et al. |
| 2004/0056905 | A1 | | 3/2004 | Lawrence |
| 2004/0230495 | A1 | * | 11/2004 | Lotvin et al. ............ 705/26 |
| 2005/0075940 | A1 | | 4/2005 | DeAngelis |
| 2006/0242018 | A1 | * | 10/2006 | Shulman et al. ......... 705/14 |
| 2006/0265285 | A1 | * | 11/2006 | Hamasaki et al. ........ 705/16 |
| 2008/0195500 | A1 | | 8/2008 | Lutnick |
| 2008/0195501 | A1 | | 8/2008 | Lutnick |
| 2008/0195531 | A1 | | 8/2008 | Lutnick |
| 2008/0195538 | A1 | | 8/2008 | Lutnick |

OTHER PUBLICATIONS eBay, eBay: The Missing Manual, Aug. 2005 ISBN: 0-596-00644-6.*
KingCart, Jan. 2004 http://web.archive.org/web/20040104185053/king-cart.com/index.html.*
Tesco, Feb. 2005 http://web.archive.org/web/20050228175143/http://www.tesco.ie/superstore/p/help/htm/helpCheckout.htm.*
Engadget, http://www.engadget.com/2005/04/04/vending-machine-dispenses-free-drinks-during-disasters/, Apr. 2005.
WalMart, http://findarticies.com/p/articies/mi_mOFNP/is_21_44/ai_n15863663, Nov. 2005.

(Continued)

*Primary Examiner*—Jeffrey A Smith
*Assistant Examiner*—Matthew Zimmerman
(74) *Attorney, Agent, or Firm*—Mark A. Miller

(57) ABSTRACT

Disclosure includes selecting a merchant from a plurality of merchants, enabling a trial mode for the merchant, during the trial mode, receiving an indication of a first order for the merchant, forwarding the indication of the first order to the merchant, allocating a first payment for the first order to the merchant, and requesting an acceptance of a membership status from the merchant.

11 Claims, 5 Drawing Sheets

OTHER PUBLICATIONS

International Search Report and Written Opinion for International Application No. PCT/US07/68883, dated Jun. 4, 2008 (8 pages).
English, David, Site Selection—The three rules of retailing, location, coation, and location—extent to e-commerce; Computer Shopper, p. 1-4, Mar. 1, 2000.
USPTO Office Action for U.S. Appl. No. 11/673,446, Apr. 15, 2008 (10 pages).
USPTO Office Action for U.S. Appl. No. 11/673,451, Apr. 29, 2008 (10 pages).
USPTO Office Action for U.S. Appl. No. 11/673,458, Apr. 16, 2008 (8 pages).
USPTO Office Action for U.S. Appl. No. 11/673,464, Apr. 10, 2008 (9 pages).
U.S. Appl. No. 11/673,446, filed Feb. 9, 2007, Lutnick.
U.S. Appl. No. 11/673,451, filed Feb. 9, 2007, Lutnick.
U.S. Appl. No. 11/673,458, filed Feb. 9, 2007, Lutnick.
U.S. Appl. No. 11/673,464, filed Feb. 9, 2007, Lutnick.
USPTO Office Action for U.S. Appl. No. 11/673,446, Dec. 12, 2008 (11 pages).
USPTO Office Action for U.S. Appl. No. 11/673,451, Dec. 12, 2008 (14 pages).
USPTO Office Action for U.S. Appl. No. 11/673,458, Dec. 12, 2008 (12 pages).
USPTO Office Action for U.S. Appl. No. 11/673,464, Dec. 11, 2008 (12 pages).
USPTO Office Action for U.S. Appl. No. 11/673,446, May 13, 2009 (13 pages).
USPTO Office Action for U.S. Appl. No. 11/673,451, May 13, 2009 (19 pages).
USPTO Office Action for U.S. Appl. No. 11/673,451, Jul. 8, 2009 (3 pages).
USPTO Office Action for U.S. Appl. No. 11/673,458, May 13, 2009 (15 pages).
USPTO Office Action for U.S. Appl. No. 11/673,464, May 13, 2009 (18 pages).
USPTO Examiner Interview Summary for U.S. Appl. No. 11/673,446, Dec. 1, 2009 (2 pages).
U.S. Appl. No. 12/697,866, filed Feb. 1, 2010, Lutnick.
USPTO Notice of Allowance and Fees Due for U.S. Appl. No. 11/673,446, Dec. 1, 2009 (19 pages).
USPTO Examiner Interview Summary for U.S. Appl. No. 11/673,464, Nov. 30, 2009 (2 pages).
USPTO Notice of Allowance and Fees Due for U.S. Appl. No. 11/673,464, Nov. 30, 2009 (22 pages).
Australian Examiner's Report for Australian Application No. 2007216734, dated Nov. 24, 2008 (2 pages).
http://www.yellowpages.com.au/browseibrowseEntry.do, dated Mar. 24, 2003.
Australian Examiner's Report for Australian Application No. 2007216734, dated Jun. 26, 2009 (2 pages).
International Preliminary Exam Report for International Application No. PCT/US07/68883, dated Nov. 17, 2008 (4 pages).
USPTO Examiner Interview Summary for U.S. Appl. No. 11/673,446, Aug. 28, 2009 (4 pages).

* cited by examiner

METHOD AND SYSTEM FOR PROVIDING A TRIAL OF A REFERRAL SERVICE TO A MERCHANT BASED ON A PLAN FOR EXPANSION

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled in every drawing. In the drawings.

DETAILED DESCRIPTION

Computing

Figure 1:
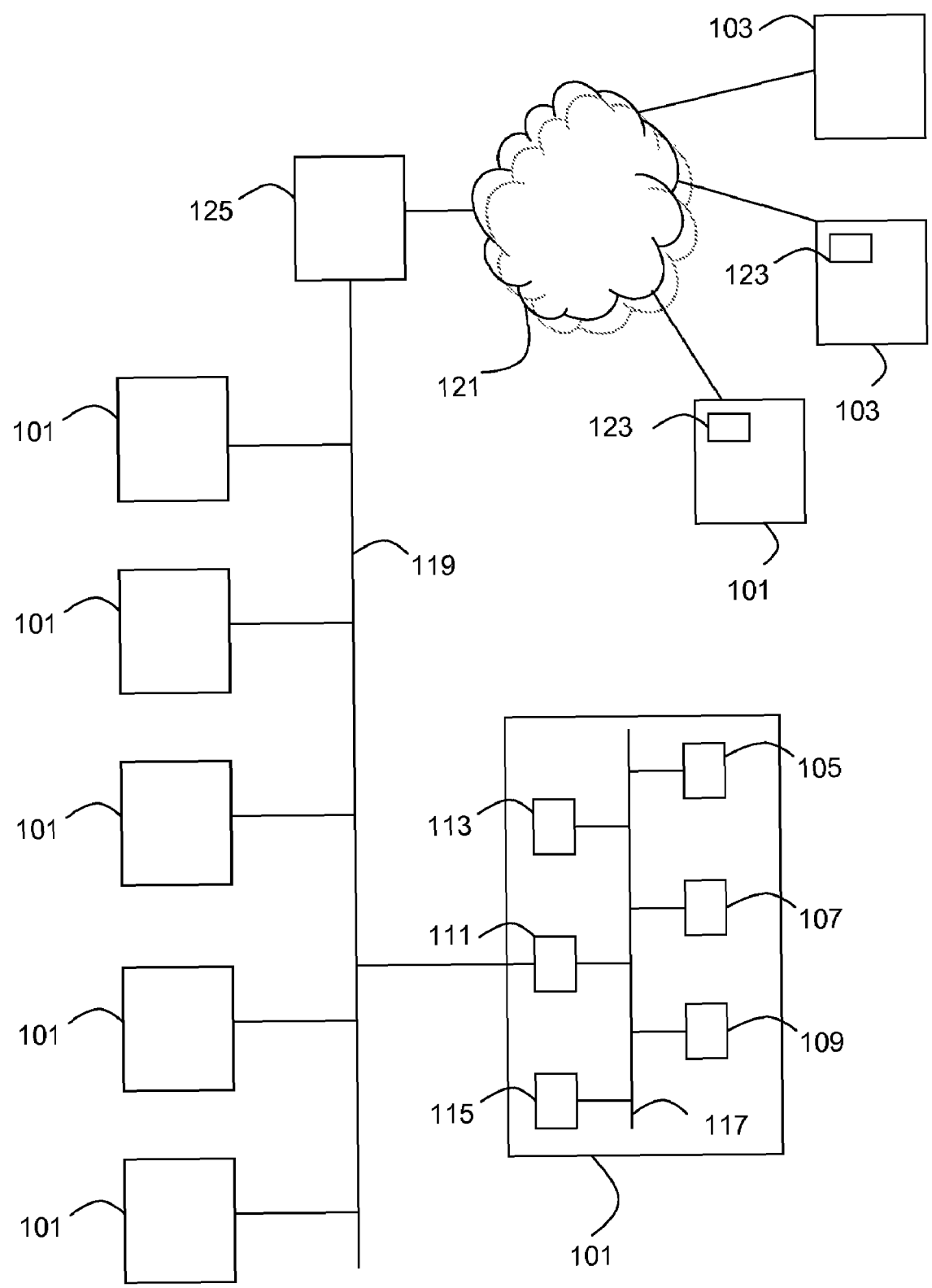
FIG. 1 illustrates a computer system architecture that may be used to perform one or more acts in accordance with some embodiments of the present invention.

It should be appreciated that the various processes described herein may be implemented by, e.g., appropriately programmed computer systems, e.g., general purpose computers 101 and/or computing devices 103, such as those illustrated in FIG. 1. A computing device 103 may include a specialized or general purpose computing device such as a cellular phone, a personal digital assistant, and/or any other portable or non-portable computing system that is not a general purpose computer.

A "processor" 105 means one or more microprocessors, central processing units (CPUs), computing devices, microcontrollers, digital signal processors, application specific integrated circuits, or like devices or any combination thereof. A processor may include an Intel® Pentium®, Centrino®, and/or Core® processor. Typically, a processor 105 will receive instructions (e.g., from a memory or like device), and execute those instructions, thereby performing one or more processes defined by those instructions.

Thus a description of a process is likewise a description of an apparatus for performing the process. The apparatus that performs the process may include, e.g., a processor 105 and those input devices and/or output devices (e.g., a keyboard 107, mouse, trackball, microphone, touch screen, printing device, display screen 109, speaker, network interface 111) that are appropriate to perform the process.

Further, programs (i.e., collections of instructions) that implement such methods (as well as other types of data) may be stored and transmitted using a variety of media (e.g., machine-readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

In some embodiments, processor 105 may execute an operating system which may include, for example, the Windows-based operating systems (e.g., Windows NT, Windows 2000 (Windows ME), Windows XP, Windows Vista) available from the Microsoft Corporation, MAC OS System X operating system available from Apple Computer, one or more of the Linux-based operating system distributions (e.g., the Enterprise Linux operating system available from Red Hat, Inc.), the Solaris operating system available from Sun Microsystems, or UNIX operating systems available from various sources. Many other operating systems may be used, and the invention is not limited to any particular operating system.

The processor and operating system together may define a computer platform for which programs stored on a machine-readable medium may be written in various programming languages, including an object-oriented programming language, such as SmallTalk, Java, C++, Ada, Python, or C# (C-Sharp), functional programming languages, scripting programming languages such as JavaScript, and/or logical programming languages. Various aspects of the invention may be implemented in a non-programmed environment (e.g., documents created in HTML, XML or other format that, when viewed in a window of a browser program, render aspects of a GUI or perform other functions). Some implementations of the present invention may be implemented using a plurality of programming languages and techniques known collectively as AJAX to provide a user with an interactive web-based user interface.

Various embodiments of the present invention may include a network environment including one or more computing systems (e.g., general purpose computers 101, other computing devices 103) in communication through one or more communication networks (e.g., a LAN 119, the Internet 121). The computer systems may communicate directly or indirectly, via any wired or wireless medium (e.g., the Internet 121, LAN 119, WAN or Ethernet, Token Ring, a telephone line, a cable line, a radio channel, an optical communications line, commercial on-line service providers, bulletin board systems, a satellite communications link, cellular telephone networks, a WI-FI network, a Bluetooth communication link, a combination of any of the above).

Various aspects of the invention (e.g., program elements stored on machine-readable media and executable by one or more processors) may be distributed among one or more computer systems configured to provide a service to one or more client computer systems. For example, in some embodiments, a plurality of computing systems may be organized as a central authority connected to a LAN or other communication network. These computing systems may receive requests and other information from remote computing systems through the Internet 121.

In some embodiments of the present invention, one or more computer systems may act as a database server that stores information regarding merchants, orders, and/or any other desired information. The database server may respond to database requests such as structured query language (SQL) queries by providing access to a database (e.g., searching of the database, writing to the database).

In some embodiments, one or more computer systems may act as a web server. A web server may be configured to respond to network requests (e.g., HTTP messages, XMLHTTP requests) from web browsers executed by remote computer systems. For example, a web browser 123 executed by a computing system may direct an HTTP message through the Internet 121 to an edge routing device 125 connected to the LAN 119. The edge routing device 125 may be configured to direct the HTTP message to the web server through the LAN 119. The web server may provide a response (e.g., an HTML document) to the web browser 123 through the edge routing device 125 and Internet 121. The web server may be configured to communicate with other computer systems (e.g., a database server) to generate responses to such a received request.

In some embodiments, a server computer/centralized authority may not be necessary or desirable. For example, the present invention may, in an embodiment, be practiced on one or more computing devices without a central authority. In such an embodiment, any functions described herein as performed by a server or data described as stored on a general purpose computer may instead be performed by or stored on one or more such computing devices.

The term "machine-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 113 and other persistent memory. Volatile media include dynamic random access memory 115 (DRAM), which typically constitutes the main memory of a computer system. Transmission media include coaxial cables, copper wire and fiber optics, including the wires that comprise a system bus 117 coupled to the processor. Transmission media may include or convey acoustic waves, light waves and electromagnetic emissions, such as those generated during radio frequency (RF) and infrared (IR) data communications. Common forms of machine-readable media include, for example, a floppy disk, a flexible disk, a hard disk, a magnetic tape, any other magnetic medium, a CD-ROM, a DVD, any other optical medium, punch cards, a paper tape, any other physical medium with patterns of holes, a RAM, a PROM, an EPROM, a FLASH-EEPROM, any other memory chip or cartridge, a carrier wave, or any other medium from which a computer can read.

Various forms of machine-readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a machine-readable medium storing a program for performing the process. The machine-readable medium can store (in any appropriate format) those program elements that are appropriate to perform the process.

Where a process is described, in some embodiments the process may operate without any user intervention. In other embodiments, the process includes some human intervention (e.g., an act is performed by or with the assistance of a human).

Just as the description of various acts in a process does not indicate that all the described acts are required, embodiments of an apparatus may include one or more computer systems operable to perform some (but not necessarily all) of the described process.

Likewise, just as the description of various acts in a process does not indicate that all the described acts are required, embodiments of a machine-readable medium storing a program or data structure include a machine-readable medium storing a program that, when executed, can cause one or more processors to perform some (but not necessarily all) of the described process.

Where databases are described, it will be understood by one of ordinary skill in the art that (i) alternative database structures to those described may be readily employed, and (ii) other memory structures besides databases may be readily employed. Any descriptions of any sample databases presented herein are illustrative arrangements for stored representations of information. Any number of other arrangements may be employed besides those suggested herein. Further, any database format (including relational databases, object-based models and/or distributed databases) may be used to store and manipulate the data types described herein. Likewise, object methods or behaviors of a database may be used to implement processes described herein. In addition, the databases may, in a known manner, be stored locally or remotely from a device which accesses data in such a database.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants may file additional applications to pursue patents for subject matter that has been disclosed and enabled but not claimed in the present application.

Terms

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", "having", "containing", "involving", and variations thereof mean "including but not limited to", unless expressly specified otherwise. The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". Similarly, the phrase "based on" does not mean "based on the entirety of", "based on all of", or variations thereon, unless expressly specified otherwise.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like. The term "determining" does not imply that mathematical processing must be performed, and does not imply that numerical methods must be used, and does not imply that an algorithm or process is used. The term "determining" does not imply that any particular device must be used. For example, a computer need not necessarily perform the determining.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the present invention", unless expressly specified otherwise.

The term "money account" and variations thereof used herein should be understood to mean any record of monetary value and/or any collection of money. For example, bank accounts (e.g., checking and saving accounts), money transferor accounts (e.g., Paypal.com accounts), credit card balances, and collections of money in a cash register are examples of money accounts.

The term "electronic message" and variations thereof used herein should be understood to mean any electronic representation of information. For example an HTTP message, an XMLHTTP request, an SMS message, a database message, an MMS message, a database message (e.g., SQL message) or any other series of electrical signals that represent information may be considered an electronic message. An electronic message does not include information identifying a source and/or destination such as the information typically present in a TCP/IP packet header. Rather, the electronic message should be considered the body/content of such a packet.

The terms "representation" and "indication" and variations thereof used herein in reference to a thing should be understood to refer to any indication of at least a portion of the thing. An indication of an order, for example, may include any indication of at least a portion of the order. In some embodiments, the order may be determined by a person or computing device from the indication of the order. In some example implementations, an indication may include a copy of an order in any of a variety of formats, compressions, and/or encryptions. In another example implementation, an indication may include an index or other identifier, such as a position in a list, an ID number, or a database key. An indication of a thing may be in the same or different medium as an original thing. For example, a number "1" may indicate a sound, a color, a menu item, or any other thing depending, e.g., on the configuration of a computing system configured to interpret the number. In some implementations, an indication may be divided into a plurality of portions, such as a plurality of electronic messages being transmitted from one location to another.

The term "collector of orders" and variations thereof used herein should be understood to mean any component or individual or set of components or individuals that collect, store, or receive at least one indication of an order. A collector of orders, for example, may include a database server on which a database of orders is stored, the database itself, and a website (i.e., a web server and/or other components used to operate a website such as executed programs) through which a user may submit an order to be stored in the database on the database server. In some embodiments, a collector of orders may include an application programming interface (API) that may be used to access orders (e.g., orders stored in a database).

A "user" of an embodiment of the present invention may include an individual, an organization and/or a computer system that originates at least one indication of an order that is transmitted to any component of an embodiment of the present invention either directly or indirectly. For example, a user may include a visitor to a website through which the user enters information indicating the order and submits the information to an embodiment of the invention.

The term "order" and variations thereof used herein should be understood to mean one or more products and/or services that a user desired to purchase from one or more merchants. An order, for example, may include a set of food products from a restaurant, a plurality of grocery items from a grocery store, a service from a service provider, and/or a consumer product from a department or specialty store. The order should be understood to not include the merchant providing the product and/or service, however, an indication of an order may include an indication of a merchant associated with the order.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers (e.g., "a plurality of first widgets" indicates two or more widgets that are distinct from other widgets). For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are not Limiting

Neither the Title (set forth at the beginning of the first page of the present application) nor the Abstract (set forth at the end of the present application) is to be taken as limiting in any way as the scope of the present invention. An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are presented for illustrative purposes only. The described embodiments are not, and are not intended to be, limiting in any sense. One of ordinary skill in the art will recognize that the present invention may be practiced with various modifications and alterations, such as structural, logical, software, and electrical modifications. Although particular features of the present invention may be described with reference to one or more particular embodiments and/or drawings, it should be understood that such features are not limited to usage in the one or more particular embodiments or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention. Unless otherwise specified explicitly, no component/feature is essential or required.

Although process acts, algorithms or the like may be described in a particular sequential order, such processes may be configured to work in different orders. In other words, any sequence or order of acts that may be explicitly described does not necessarily indicate a requirement that the acts be performed in that order. The acts of processes described herein may be performed in any order. Further, some acts may be performed simultaneously despite being described or implied as occurring non-simultaneously (e.g., because one act is described after the other act). Further more, acts which are described as separate may be performed as a single act in some embodiments. Moreover, the illustration of a process by its depiction in a drawing does not imply that the illustrated process is exclusive of other variations and modifications thereto, does not imply that the illustrated process or any of its acts are necessary to the present invention, and does not imply that the illustrated process is preferred.

Although a process may be described as including a plurality of acts, that does not imply that all or any of the acts are preferred, essential or required. Various other embodiments within the scope of the present invention may include other processes that omit some or all of the described acts. Unless otherwise specified explicitly, no act is essential or required.

Although a process or product may be described singly or without reference to other processes or products, in some embodiments the process or product may interact with other processes or products. For example, such interaction may include linking one business model to another business model. Such interaction may be provided to enhance the flexibility or desirability of the process.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. Also, an enumerated list of items (which may or may not be numbered) does not imply that any or all of the items are equivalent to each other or readily substituted for each other.

Exemplary Embodiments

Methods and apparatus related to providing a free trial of an order referral service are described herein. For example, some embodiments of the present invention relate to providing a free trial period of an order referral service to at least one merchant. Some embodiments of such a service may receive an indication of an order for a specific merchant from a user of the service and may forward the indication of the order to the merchant. In some embodiments, the referral service may collect a fee associated with providing/maintaining the referral service. In some embodiments, the referral service may waive collection of the fee during the free trial period. In some embodiments, the referral service may include a delivery service that not only refers orders to the merchant, but also delivers products from the merchant to the user.

It is recognized, in one aspect of the present invention, that attracting merchants to use a referral service may be difficult. For example, merchant's may be unaware that a referral service exists, may be afraid that a referral service may require too high a level of technical sophistication, or may not recognize the financial advantages of receiving outside referrals in addition to traditional orders. A referral service that provides free trial periods to merchants as a method of advertising the referral service to the merchants may attract merchants to the referral service that would otherwise not use the service. Particularly, a referral service that unilaterally selects merchants without a request from the merchants may provide merchants with an opportunity to test a referral service that the merchants may not have otherwise experienced.

Figure 2:
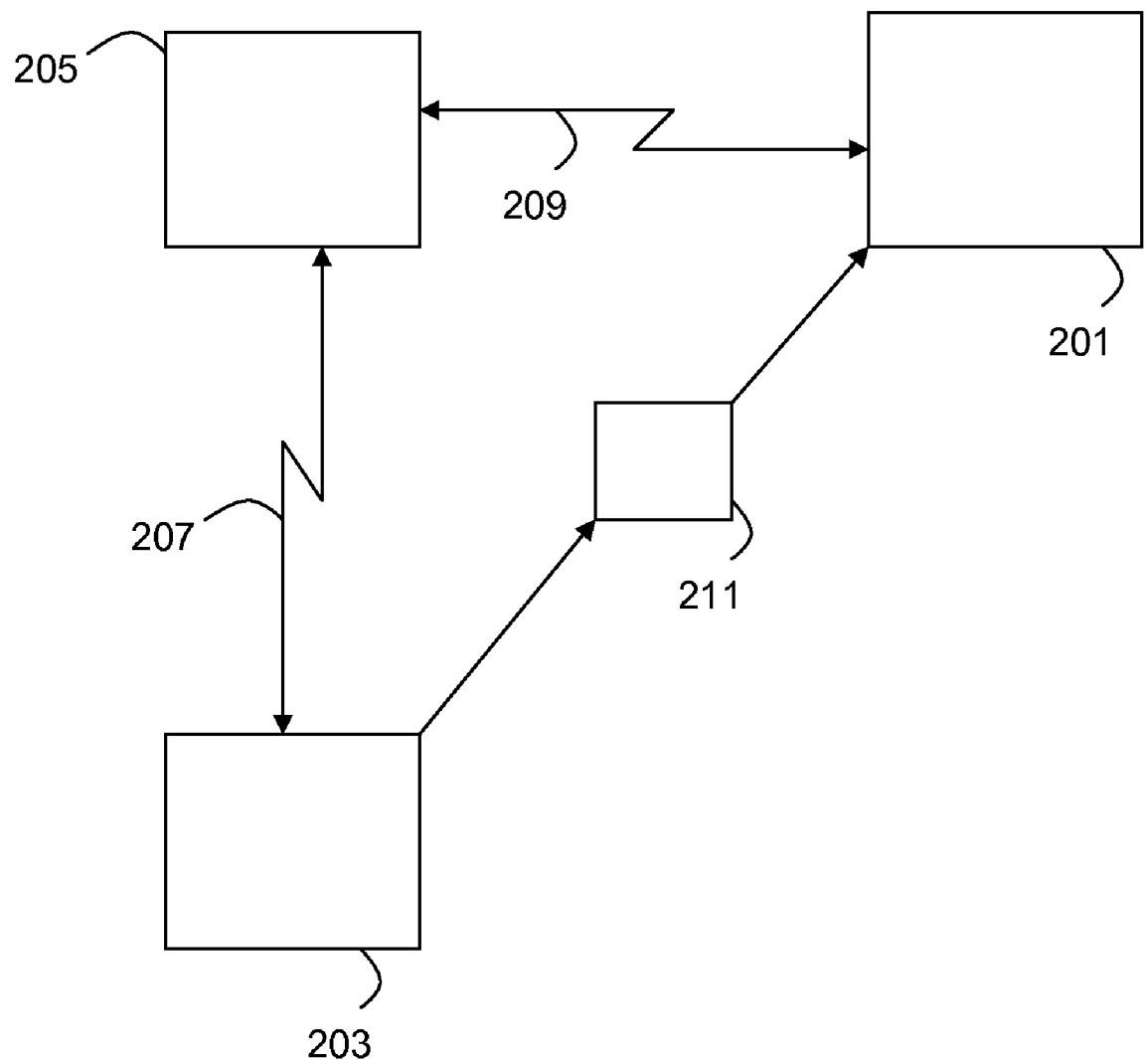
FIG. 2 illustrates an example diagram of a referral service in which the referral service provides order referral and delivery services.

FIG. 2 illustrates an example diagram of a referral service implemented on referral system 205 (e.g., a computer system as described above), in which the referral service provides order referral and delivery services. In this example embodiment, user 201 transmits an indication of an order for at least one product from merchant 203 to referral system 205 through communication link 207. Referral system 205 may then receive the indication of the order (e.g., from the communication link 207). Referral system 205 then forwards the indication of the order to merchant 203 over communication link 209. In this example embodiment, referral system 205 also transmits a request to deliver the at least one product to delivery agent 211 through a communication link 213. Delivery agent 211 obtains the at least one product from merchant 203 and delivers the at least one product to user 201 in response to the delivery request. In other implementations, however, the delivery may be performed by the merchant directly or merchant 203 may include a service provider rather than a product provider and so delivery of a product may not be needed and a service may be performed instead.

In various implementations, merchant 203 may include, for example, a seller of products and/or a provider of services. For example, in some implementations, the merchant may include a restaurant and/or a retail store. In some implementations, the merchant may include multiple merchants of the same or different types. For example, in one implementation, the order may include an order for a plurality of products from the multiple merchants. Delivery agent 211 may, in such an implementation, retrieve the products from all the multiple merchants and deliver the products to user 201.

In various implementations, referral system 205 may include one or more computing systems, as discussed above. In some implementations referral system 205 may include one or more people performing one or more acts of referral system 205 (e.g., receiving indications of orders, forwarding indications of orders, etc.). In some implementations, referral system 205 may provide the user with a user interface through which the user may place the order. For example, in some implementations, the user interface may include a website or mobile device interface. In some implementations, the user interface may include a list or other representation of products and/or services that the user may order from the merchant 203. In some implementations, the list or other representation may include a price of each product and/or service.

In one implementation, communication links 207, 209, and/or 213 may include electronic network links that include the Internet and/or one or more local area networks. In one implementation, communication links 207, 209 and/or 213 may include a telephone line through which facsimile transmission may be made. In other examples, communication links 207, 209, and/or 213 may include cable lines, DSL lines, face-to-face communication, and/or any other medium through which communication may be made. Each communication link may be separate or may be shared.

In one implementation, delivery agent 211 may include a person who travels from merchant 203 to user 201. In some implementations, delivery agent 211 may deliver to another location rather than to the user if the user 201 desires such delivery (e.g., if the order indicates such delivery). In some implementations, delivery agent 211 may include a person traveling by an automobile, bicycle, or any other means. In some implementations, communications link 213 used to communicate with delivery agent 211 may include a telephone line and/or another means of electronic communication. For example, in some implementations a cellular telephone may communicate information regarding the delivery to the delivery agent 211, e.g., through a telephone call or text message. In other implementations, an electronic message such as an SMS, MMS, or email message may communicate the information, for example to another mobile device carried by delivery agent 211 or to a central dispatcher that then relays the information to delivery agent 211.

In some embodiments, a payment may be exchanged among merchant 203, user 201, and referral system 205. In some implementations, for example, the user may provide a payment to delivery agent 211. Delivery agent 211 may provide the payment to referral system 205. Referral system 205 may then provide the payment or a portion of the payment to merchant 203. In some implementations, delivery agent 211 may provide the payment to merchant 203 rather than referral system 205. In such implementations, merchant 203 may, in some circumstances, provide a portion of the payment to referral system 205 for providing referral services. In some implementations, the user may provide merchant 203 and/or referral system 205 with payment directly rather than paying delivery agent 211. In such implementations, the referral system 205 and merchant 203 may distribute portions of the payment as is appropriate (e.g., distribute the payment between merchant 203 and referral system 211 according to a prearranged agreement). In some implementations, a portion of payment distributed to referral system 205 may be provided to delivery agent 211 to pay for delivery services.

In some embodiments, as a condition for using (e.g., becoming a customer of) a referral service, a merchant may be required to provide a lower than standard price to users of the referral service. The standard price, for example may be a normal price paid for products and/or services by traditional customers of the merchant (e.g., walk-in customers). In some implementations, the standard price may be a normal price paid for delivery and/or take-out customers (e.g., in the case of a restaurant), which may sometimes be different (higher or lower) from a normal price paid by traditional customers (e.g., dine-in customers). In some implementations, the reduction in the standard price may be used to pay for the referral service. For example, the referral service may charge users the standard price despite the price reduction by the merchant. The referral service may then collect the difference between the standard price and the lowered price as a fee for providing the referral service. A lowered price charged by a merchant may be referred to as a merchant portion of a total payment for a product and/or service. The markup by the referral service to raise the lowered price back to the standard price (or some other price) may be referred to as a fee portion of the total payment for the product or service. As discussed in more detail below, the condition for lowering the standard price and the collection of a fee portion may be waived during a free trial period.

In some implementations, a percentage or amount that the standard price may reflect the cost of providing the service along with a reasonable profit for the referral service. In some implementations, the percentage may be based, at least in part, on a number of orders received for the merchant (e.g., if the merchant receives more orders, the percentage may be decreased). In some implementations, the percentage may be based, at least in part, on a type of service provided (e.g., referral only, delivery and referral). In some implementations, the percentage may be based, at least in part, on a type of product and/or service ordered.

Figure 3:
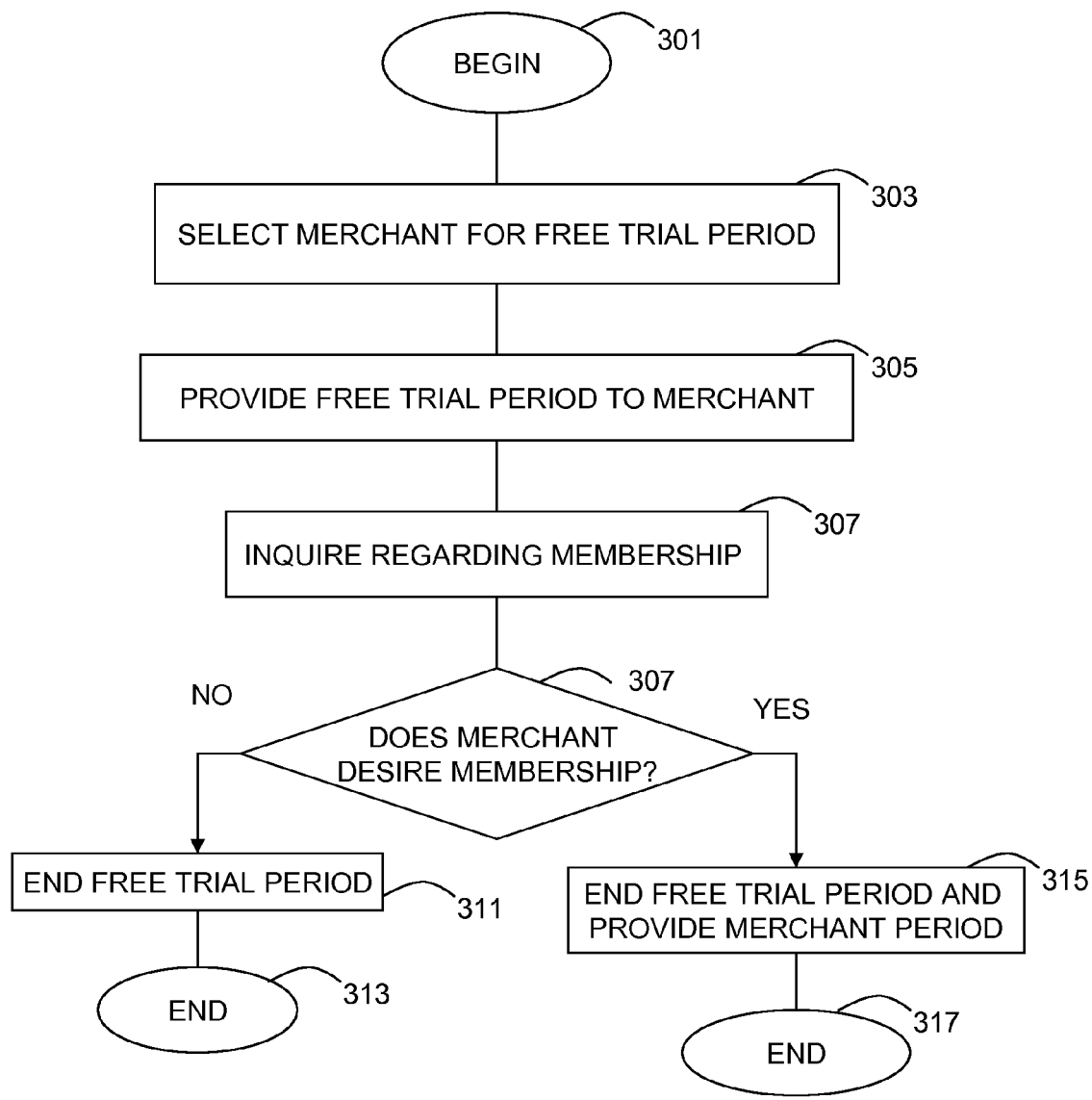
FIG. 3 illustrates an example process that may be performed by a referral service according to one embodiment of the present invention.

FIG. 3 illustrates an example process 300 according to one embodiment of the present invention that begins at block 301. Process 300 may be performed, for example, by referral system 205.

As indicated at block 303, process 300 may include an act of selecting at least one merchant (e.g., 203) for a free trial period. In some embodiments, the merchant may be selected, for example, from a plurality of merchants in a geographic area, such as a city, zip code, etc.

In some embodiments, the merchant may be selected based, at least in part, on a request received from the merchant. In some embodiments, the request may include a completed request form distributed by an agent of the referral service to the merchant or accessed through a user interface of the referral service. The completed request form may indicate the merchant's desire for a free trial period. In some implementations, the request form, for example, may be submitted by facsimile, email, and/or through a website. Such embodiments allow a free trial period to act as an advertisement for a referral service to those merchants that are aware of the service and curious to try the service. For example, merchants that are interested in the service may try the service for free (e.g., without being required to provide the fee portion of payments received for orders, as described below) for a period (e.g., a period of time, a number of orders).

In some embodiments, the merchant may be assigned a free trial period without any submitted request. In such embodiments, the free trial period may act as an advertising tool allowing the merchant to try a referral service even if the merchant is unaware that the service exists.

In some embodiments, the merchant may be specifically targeted based on one or more desired characteristic according to an expansion plan. The merchant may be targeted from a set of available merchants. In some implementations, the set of available merchants may include all merchants in an area (e.g., a city, zip code). In some implementations, the set of available merchants may include all merchants of a particular type (e.g., restaurants). In some implementations, a referral service may determine a set of available merchants by referencing one or more external sources (e.g., telephone books, collections of menus, websites). In some implementations, a person may determine a set of available merchants. In some implementations, an automated system (e.g., a computer system as discussed above) may determine a set of available merchants.

For example, in some implementations, the merchant may be selected based on the location of the merchant. For example, the merchant may be selected because there are few or no other merchants using the referral service in a particular geographic region near the location of the merchant. In such an implementation, a plurality of merchants may be chosen in this manner to direct advertising at a set of merchants that, if some or all of the merchants become customers of the referral service (e.g., after the free trail period), may result in a desired geographic distribution (e.g., wide, even) of merchants that are customers of the referral service.

In some implementations, the merchant may be selected based on a type of the merchant. For example, the merchant may be selected because there are few or no merchants using the referral service of a particular type of the merchant. In such an implementation, a plurality of merchants may be chosen in this manner to direct advertising at a set of merchants that may result in a desired distribution (e.g., wide, focused) of merchant types using the referral service if some or all of the merchants become customers of the referral service. Implementations of the present invention are not limited to a level of merchant type. For example, in one implementation, the merchants may include restaurants and the types of merchants may include cuisine types (e.g., Chinese, Italian, Indian, etc.) of the restaurants, and in another implementation, the types may include a broader type of merchant (e.g., hardware store, grocery store, restaurant, etc.). In some implementations, types may be divided into a set of categories and any number of levels of subcategories to improve targeting specificity.

In some implementations, the merchant may be selected based on a capacity or market share of the merchant. For example, the merchant may be selected because the merchant is one of the largest, most popular, and/or well stocked merchants. In one implementation, a plurality of merchants may be selected in this manner to direct advertising at a set of merchants that may result in an ability to fulfill a large capacity of orders if some or all of the merchants become customers of the referral service. In another implementation, a plurality of merchants may also be selected in this fashion to direct advertising at a set of merchants that may result in the largest or most popular merchants using the referral service if some or all of the merchants become customers of the referral service. In one implementation, for example, the merchants may include restaurants, and a restaurant having one of the largest capacities to fulfill orders may be selected. In another implementation, one or more of the most popular restaurants may be selected.

It should be understood that any of the described selection plans may be modified or combined. In one implementation, a merchant may be selected based on a combination of location, type, and capacity. For example, the largest Chinese restaurant in a geographic area in which no other Chinese restaurants use the referral service may be selected. Furthermore, it should be recognized that the present invention is not limited to any particular selection plan and that the above plans are described as examples only. Other example selection plans may include selecting merchants based on cost, name, reputation, age, targeted market/demographic and/or any other desired characteristic.

Figure 4:
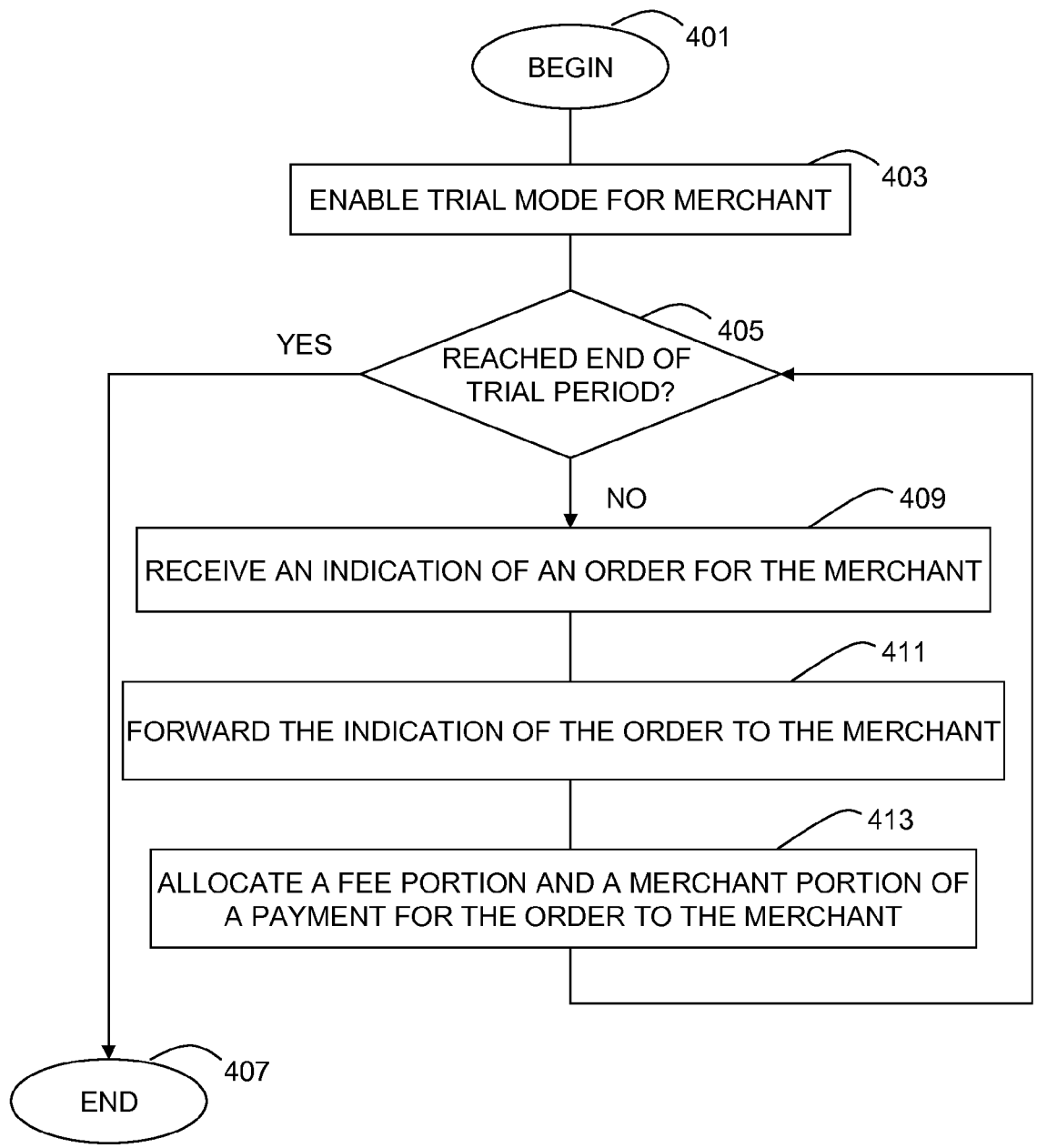
FIG. 4 illustrates an example process that may be performed by some embodiments of the present invention to provide a free trial period to a merchant.

As indicated in block 305 of FIG. 3, process 300 may include providing a free trial period to the selected merchant. FIG. 4 illustrates an example process 400 that may be performed by some embodiments to provide a free trial period to the selected merchant. Process 400 begins at block 401.

As indicated in block 403, process 400 may include enabling a free trial mode for the selected merchant. Enabling the free trial period may include, for example, making a database entry or some other storage of information regarding the merchant. In some implementations, the information may include contact information (e.g., telephone number, mailing address, facsimile number, and/or email address), order transmission information (e.g., a preference as to how orders should be transmitted to the merchant), and/or a merchant identifier (e.g., a name and/or unique ID number). In some implementations, the information may include further information regarding details of the merchant such as type of merchant (e.g., cuisine type of a restaurant), capacity of a merchant (e.g., number of orders accepted over a period of time), hours of a merchant (e.g., hours that the merchant accepts orders), pick-up information for the merchant (e.g., a pick up address for a delivery agent to pick up products for delivery to customers if different than mailing address), payment information (e.g., information identifying a money account, and/or an address to send checks or other payments for delivered products), and/or any information that may be useful to refer a user to the merchant (e.g., a menu, a list of products or services, a logo, a website address, advertising for the merchant, etc.).

In some implementations, the information may include an indication (e.g., a flag, a database table entry) that the merchant is in a trial mode. This indication may, for example, differentiate the merchant from being in a membership mode. In another implementation, separate databases (e.g., a trial database and a membership database) or other storage locations may be used to store information regarding merchants in trail modes and merchants in membership modes so a separate indicator need not be stored, but rather reference to a particular database may indicate trial mode or merchant mode.

In some implementation, at least a portion of the information that is stored in the database may be obtained from the merchant. For example, the information may be obtained from a trial period request form received from the merchant, as discussed above. In some implementations, at least a portion of the information may be received from public sources of information, such as telephone books, advertisements from the merchant, and/or web pages (e.g., the merchant's web page or other web pages with information regarding the merchant). For example, in one implementation, a web crawler may search web pages (e.g., YellowPages.com, CitySearch.com) and collect information regarding the merchant to store in the database. In some implementations, a person may collect at least a portion of the information (e.g., a person may review documents or web pages, or may call the merchant and enter the information into a user interface) to store in the database.

As indicated in block 405, process 400 may include determining if the end of a free trial period has been reach. If the end of the free trial period has not been reached, the referral service may await an indication of an order. If such an indication is received before the end of the free trial period process 400 may continue to block 409, discussed below.

If, however, the end of the free trial period is reached, or is reached before an indication of an order is received, process 400 may branch to block 407 and end. In some embodiments, the end of a trial period may be reached after a period of time passes from the start of the trial period. In some embodiments, the end of the trial period may be reached after a predetermined number of indications of orders are forwarded to the merchant. In some embodiments, the end of the trial period may be reached after a predetermined total dollar value of orders is forwarded to the merchant. In some embodiments, a combination of the above methods may be used to determine the end of the free trial period. For example, in one implementation, the end of a free trial period may occur after a predetermined amount of time or after a predetermined number of indications of orders are forwarded to the merchant, whichever event occurs first. It should be understood that these processes of determining when a trial period ends are examples only and that embodiments of the present invention may employ any process to determine when a trial period ends.

As indicated in block 409, process 400 may include receiving an indication of an order for the merchant. The indication of the order, for example, may indicate at least one ordered product or service from the merchant. In some implementations, the received indication of the order may include one or more electronic messages.

In some implementations, an indication of an order may also include one or more of a delivery location (e.g., an address), a user indicator (e.g., a name), a delivery time (e.g., immediately, or some desired time in the future), and special instructions for the merchant and/or delivery agent (e.g., deliver to the back, include extra napkins).

In some implementations, an indication of the merchant may also be received. The indication of at least one merchant may include an electronic message received from a user of a user interface and may identify the merchant to a referral service. In some implementations, an indication of an order may include an indication of the merchant.

In some embodiments, the indication of the order may be received from at least one user of the referral service. The user may include a user of a user interface, for example, a website or mobile device interface, such as a cellular telephone interface. In some implementations, the user interface may be provided to the user from, for example, a web server of the referral service. The user interface may allow the user to select one or more products or services (e.g., from a menu or list of products and/or services) and to submit the indication of the order to the referral service.

In some embodiments, the indication of the order may be received from one or more order collectors. An order collector may include, for example, another referral service, and/or a remote website or computer system (e.g., a computer system that uses an API of the referral service to transmit orders to the referral service).

In some embodiments, the indication of the order may be received by a facsimile machine. In some embodiments, the indication of the order may be received by telephone (e.g., by a person, by an automated system).

It should be understood that the present invention is not limited to any particular manner of receiving indications of orders.

As indicated in block 411, some embodiments of process 400 may include forwarding the indication of the order to the merchant. In some implementations, forwarding the indication of the order may include transmitting the received indication to the merchant. In some implementations, forwarding the indication of the order may include adding or removing some information from the received indication of the order. In some implementations, the transmitted indication of the order may include one or more electronic messages. For example, in some implementations, the indication of the order may be forwarded by transmitting a facsimile and/or emailing the indication of the order to the merchant.

In some embodiments, an indication of an order may include an order for products and/or services from multiple merchants. In some implementations, the indication of the order may be forwarded to each merchant of the multiple merchants. In some implementations, such an indication of an order may be divided into sub-indications of the order. Each sub-indication may indicate a portion of the order that for a particular merchant. The sub-indication may be forwarded to the respective merchants.

As indicated in block 413, some embodiments of process 400 may include allocating a fee portion and a merchant portion of a payment for the order to the merchant. In some embodiments, the combined fee portion and merchant portion may encompass a total payment for the order (excluding possible gratuity to delivery providers or other service providers in some embodiments). The merchant portion may include a portion that is allocated to the merchant in both a trial mode and a membership mode. The fee portion may include a portion that is allocated to the merchant during the free trial period and is otherwise allocated to the referral service, as a fee for the referral service. As discussed above, the fee portion and merchant portion may sum to a standard price charged be the merchant.

Some embodiments may further include receiving an indication of the payment for the order (not indicated). An indication of a payment may include, for example, one or more of an indication that a payment has been made, an indication that a payment has been authorized, and/or an indication of a promise to make a payment in the future. In some implementations, an indication of a payment may include an indication that a payment has been made to a desired money account. In some implementations, the indication may be received from an entity making a payment to the desired money account (e.g., a bank, a credit card company, a money transferor). In some implementations, the indication may be received from an entity receiving the money (e.g., a bank, a credit card company, a money transferor). In some implementations, the indication may be received after the money is authorized to be transferred into the desired account but before the money is transferred/received. In some implementations, the indication may be received after the money is transferred into/received at the desired account.

In some embodiments, the indication may be received from the user of the referral service. In some implementations, the indication may include a promise to make a payment to the merchant or a delivery agent in the future (e.g., upon delivery of a product or performance of a service). In some implementations the indication may include payment authorization information such as a credit card number and expiration date (e.g., entered through a user interface such as a website). In some embodiments, the indication of a payment may be received with the indication of the order.

Some embodiments may include collection of the payment. For example, in some embodiments, a delivery agent may collect a promised payment upon delivery of a service, or a credit card may be charged an authorized amount. Such embodiments may further include distributing the collected merchant and fee portion of the collected payment to the merchant.

In some embodiments, the merchant may collect the payment rather than the referral service or delivery agent. In such embodiments, during the trial mode, the referral service may not collect either the fee or merchant portion from the merchant, but, as discussed below, the referral service may collect the fee portion from the merchant during the membership mode.

In some embodiments, process 400 may further include collecting information regarding orders placed during the trial period. For example, the referral service may collect information regarding a number of orders, a type of order, a dollar value of orders, a time at which orders are received, or any other information desired regarding the orders.

In some implementations of process 400, after block 413 or any additional and/or alternative act, process 400 may loop back to block 405. This may continue until an end of a free trial period as described above.

After the free trial period, some embodiments of process 300, as illustrated in FIG. 3, may continue at block 307. In some embodiments, as indicated by block 307, process 300 may include inquiring with the merchant regarding becoming a customer of the referral service. For example, in some embodiments, a phone call may be made, by a person or an automated system, to ask the merchant if the merchant desires to become a customer of the referral service. In some implementations, a facsimile, email, or other electronic message may be sent to the merchant to inquire regarding becoming a customer. In some implementations a merchant may become a customer of the referral service by completing a form included in the inquiry (e.g., the facsimile, email, or other message), by requesting membership using a telephone (e.g., by communicating with a person and/or an automated system), and/or by submitting a request through a user interface of the referral service (e.g., a website).

In some embodiments, a referral service may provide the merchant with information recorded during the trial period. As discussed above with respect to collecting information during the trial period, such information may include any desired information regarding the received indications of orders. In some implementations, the information may include, for example, an indication of the total sales made through the referral service. This information may also act as an advertising mechanism to the merchant that allows the merchant to review the benefits received by using the referral service during the free trial period.

In some embodiments, as indicated by block 309, process 300 may include determining whether the merchant desires to become a customer of the referral service, e.g., based on a response to the inquiry described above. For example, a response to an inquiry may be analyzed to determine if the merchant desires to become a customer. In some implementations, for example, a particular telephone tone entered by a merchant in response to an automated may be used to indicate a desire to become a customer and a second tone may indicate a desire not to become a customer. In some implementations, for another example, a form transmitted by facsimile or otherwise transmitted to the merchant may include a check box or other indicator identifying a desire to become a customer. Such tone or indicator may be examined (e.g., by a person or automated system) to determine a merchant's desire to become a customer. It should be understood that the present invention is not limited to any particular manner of determining a merchant's desire to become a customer of a referral service.

In some embodiments, if no response is received, it may be assumed that the merchant does not desire to become a customer. In some embodiment, if no response is received, a predetermined number of repeated inquiries may be made before it is assumed that the merchant does not desire membership.

As indicated at block 311, if the merchant does not desire to become a customer, the trial mode may be ended. It should be understood that the order of acts, including the order of the ending of the free trial mode with respect to the inquiry regarding membership may be varied in some embodiments. In some implementations, for example, the free trial mode may be ended before the inquiry is made.

In some implementations, ending the free trial mode may include deleting stored information regarding the merchant and/or altering a recorded indication that the merchant is in a free trial mode. If a membership mode is not enabled (e.g., because the user does not desire to become a customer of the referral service), future indication of orders for the merchant received by the referral service may not be forwarded to the merchant. In some embodiments, process 300 may end at block 313 after ending the free trial period.

In other embodiments, if the merchant does not desire to become a customer of the referral service after the free trial period, an inquiry may be made regarding the reason that the merchant does not desire to become a customer. In some implementations, the inquiry may include asking if an additional trial period may change the merchant's decision. In some embodiments, the inquiry may include a transmission of a questionnaire (e.g., by email, facsimile and/or other electronic message). In some embodiments, the inquiry may include contacting the merchant by telephone. For example, a merchant may be called and one or more questions regarding the merchant's reasons may be asked. In some implementations, the merchant may be called by a person. The person may read a script of questions and record the merchant's answers. In some implementations the merchant may be called by an automated system. The automated system may play a recorded script and record the merchant's answers (e.g., an audio record of responses). In some implementations, the automated system may play a recorded script that includes a list of answer choices coded to telephone tones and may record the merchant's responses by recording the telephone tone entered by the merchant and/or information corresponding to the tones as is well known.

In some embodiments, the inquiry may include a question regarding how a referral service may be changed to improve the referral service and/or what may be changed that may convince the merchant to become a customer of the referral service. In some implementations, a changed may be made to the referral service based, at least in part, on a response to such an inquiry. For example, if a merchant identifies a preference for a different method of forwarding orders (e.g., email rather than facsimile), then such a change may be made to the service and the merchant may be given an additional free trial period to test the service with the changed feature (e.g., in which orders are emailed rather than transmitted by facsimile). In various implementations, the types of changes may be related to delivery methods, hours of delivery, information recording, order transmission, language, and/or any other desired feature of a referral service.

In some embodiments, if a merchant does not desire to become a customer, the merchant may be given an additional trial period. For example, process 300 may loop back to block 305. The process may loop a limited number of times corresponding to a limited number of free trial periods. Providing additional free trial periods may allow a merchant a greater amount of time to try the referral service and decide on membership.

In some implementations, an additional trial period may be given in limited situations. For example, in some implementations, an additional trial period may be given if a merchant requests such an additional period. In some implementations, the merchant may be given an additional trial period if the merchant responds to an inquiry regarding becoming a customer. In some implementations, an additional trial period may be given if the merchant indicates, in response to an inquiry regarding becoming a customer, that an additional trial period may affect the merchant's decision. In some implementations, a merchant may be provided with an additional free trial period if the merchant identifies a reason for not becoming a customer of the merchant after the prior free trial period that may be changed during the additional free trail period. In some implementations, the merchant may be provided with an additional free trial period if the merchant possesses a targeted characteristic at the time the trial period ends (e.g., a type, volume, location characteristic as discussed above with respect to initially choosing the merchant).

Figure 5:
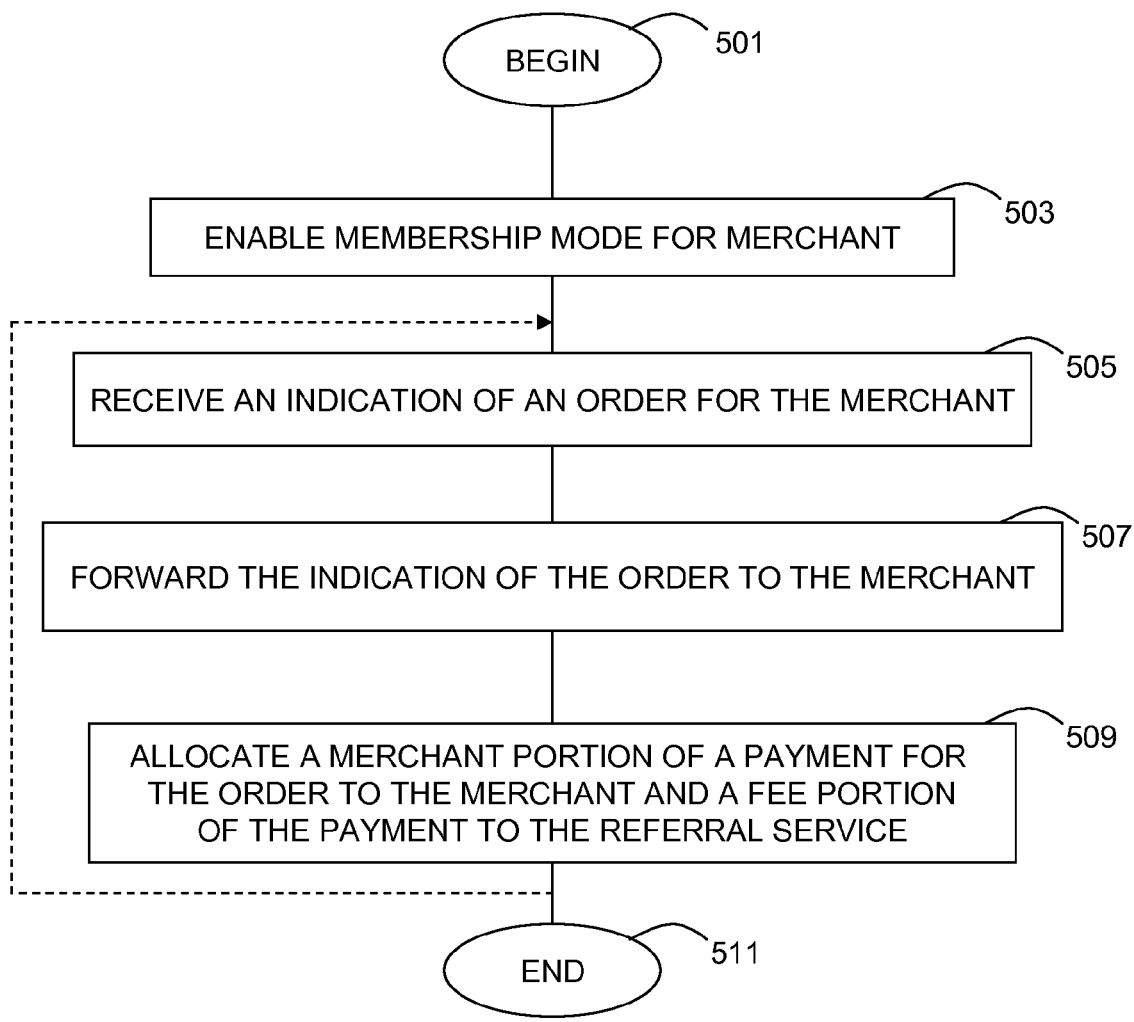
FIG. 5 illustrates an example process that may be performed by some embodiments of the present invention to provide a merchant period to a merchant.

As indicated in block 315, if the merchant desires to become a customer of the referral service, the free trial period may be ended, a membership period may be provided and process 300 may then end at block 317. Process 500 illustrated in FIG. 5, and which begins at block 501, illustrates an example process for providing a membership period to a merchant.

As indicated in block 503, the process 500 may include enabling a membership mode for the merchant. Enabling the membership mode may be substantially similar to enabling the trial mode, discussed above. For example, in some embodiments, information regarding the merchant may be entered into one or more database tables. In some implementations, the information may already be entered from the trial mode and an indication may be made or changed to identify that the merchant is in a membership mode rather than a trial mode. In some implementations, information may be transferred from one database (e.g., a trial database) to another database (e.g., a membership database).

As indicated in block 505, process 500 may include receiving an indication of an order for the merchant. The receipt of the indication for the order during the membership mode may be substantially similar to the receipt of the indication of the order described above with respect to the trial mode.

As indicated in block 507, process 500 may include forwarding the indication of the order to the merchant. Forwarding the indication to the merchant may be substantially similar in the merchant mode as forwarding the indication to the merchant described above with respect to the trial mode.

As indicated in block 509, process 500 may include allocating a merchant portion of a payment for the order to the merchant and allocating a fee portion of the payment to the referral service. As described above, the fee portion may include a payment to the referral service for providing the referral. In some implementations in which the referral service acts as a delivery service of products (e.g., food from a restaurant), the fee portion may also act as a payment for the delivery service provided (e.g., a portion of the fee portion may be provided to a delivery agent).

As described above with respect to the trail mode, the merchant mode may include receiving an indication of a payment for the order. In some implementations, process 500 may also include collecting at least the fee portion of the payment. In some implementations, the fee portion may be collected from a financial institution associated with the user. In some implementations, the fee portion may be collected from the merchant. In some implementations, the fee portion may be collected from the user (e.g., by a delivery agent). In some implementations, the entire payment may be collected rather than the fee potion only. In such implementations in which the entire payment is collected, the merchant portion may be provided to the merchant and the fee portion may be kept by the referral service.

In some embodiments, after block 509 or any alternative and/or additional acts, process 500 may loop back to block 503. Process 500 may continue in such a loop until the merchant or referral service desired to end the merchant period, at which point, process 500 may end at block 511.

User Interface Description

In some implementations, as described above, the referral service may provide a user with a user interface (e.g., a website, mobile device interface). The user interface may allow the user to select a particular merchant or merchants and products and/or services from the particular merchant or merchants. In such implementations, for example, the user interface may display a representation of available merchants (e.g., a list of merchants that may be in an identified geographical location associated with the user and/or merchants that are open at the time) to which the user may submit orders.

In some implementations, a user may select a particular merchant from the list or other representation of merchants through the user interface. The user interface may then display a list or other representation of products and/or services available to the user from the selected merchant. The list or other representation of products and/or service may include a price of each product and/or service. The user may select desired products and/or service from the merchant (e.g., through the list or other representation by clicking links, checking boxes, or otherwise selecting items). The selected products and/or services may be transmitted to the referral service as an indication of an order for forwarding to the merchant. In some implementations, such transmission may occur after the user has finished selecting products and/or services, for example after the user has proceeded to a checkout interface through which the user may authorize payment for the products and/or services and/or after the user has authorized/submitted/promised to make such payment.

In some implementations, if the user selects one or more generic products and/or services (i.e., products and/or services that are available from more than one merchant using the service) from a list or other representation of products available from a selected merchant, the referral service may advise the user that other merchants also may provide the selected product and/or service. In some implementations, the user may only be advised of another merchant able to supply a generic product if the other merchant is in a trial mode and the otherwise-selected merchant is not in a trial mode. The referral service may determine if other merchants may supply the product and/or service to the user, for example, by querying a database that contains merchant information such as menus or lists of products and/or service, hours of operations and/or geographic area to which referrals and/or delivery may be provided.

Advising merchants that other merchants may be able to supply a desired product and/or service may encourage users to try products and/or service from a wider set of merchants. In some implementations in which only merchants in a trail period are suggested to a user, such suggestion may act to develop a set of referral business for the merchant. The referral business generated may help to encourage the merchant to become a customer of the referral service after the free trial period ends.

In some implementations, rather than or in addition to first presenting a list of merchants, the referral service may provide a user interface including a representation of available products or services that may be selected without regard for the merchant supplying the product or services. An embodiment of the referral service, for example, may request or otherwise determine a location of the user and then determine which merchants service the location (e.g., by querying a database of merchant information). In some implementations, the referral service may determine the currently open merchants and the products and/or services that those merchants provide (e.g., by querying a database of merchant information). The referral service may then display a list or other representation of those products and/or services through the user interface for the user to select from. In some implementations, the user may select a product and/or service and an indication of an order for the product may be transmitted to the referral service for forwarding to the merchant. In some implementations, the selected products and/or service may be stored in a "shopping cart" of a website and the order may be submitted to the referral service after the user has finished selecting products and/or services, for example, after the user has proceeded to a checkout interface through which the user may authorize payment for the products and/or services, as is known in the art, and/or after the user has authorized/submitted/promised to make such payment.

In some such implementations, at least one particular ordered product or service may be available from multiple merchants. In such situations, one of the multiple merchants may be selected to provide the ordered product or service. In such implementations, the one merchant may be selected in, for example, a round robin fashion so that each merchant that sells a particular product or service may receive a fair portion of orders for that product or service. In some such implementations, merchants in a trial mode may be given preference to merchants in a membership mode is such situation.

It should be understood that the present invention is not limited to any particular user interface. Particularly, the present invention is not limited to a computer-based user interface. Rather, some implementations of the present invention may include a telephone interface (e.g., person to person communication over a telephone) and/or a facsimile interface (e.g., complete a form and transmit a facsimile of the form to a designated telephone number).

Example of Referral Service Providing Restaurant Deliveries

In one particular embodiment, the present invention may include a referral and delivery service for restaurants. For example, a restaurant may be selected from a plurality of restaurants in a geographic location based on some desired characteristic of the restaurant, e.g., cuisine type, market share, etc. A free trial mode may be enabled for the restaurant (e.g., by making appropriate database entries with information identifying the restaurant) to provide the restaurant with a free trial period.

During the free trail period, a user may access a website of the referral service, e.g., using a standard web browser. The website may display a list of available restaurants, including the selected restaurant. If the user chooses the selected restaurant, the interface may display a menu of food available from the restaurant. The menu may list a price associated with each food item and the interface may allow the user to select any number of food items. When the user has selected desired food items, the user may indicate that the user has finished selecting food items (e.g., by clicking a check-out, submit, or similar button). The user may then be provided with a check-out interface through which the use may enter payment information, such as credit card information, and submit an indication of the order and a delivery location to the referral service.

Upon receiving the indication of the order and indication of a payment for the order, the referral service may forward the indication of the order to the merchant through a predefined forwarding method, such as by transmitting a facsimile of the order to the merchant's facsimile machine. The referral service may record the items ordered and the dollar value of the order. The referral service may arrange for payment to be collected from a credit card company, if the user chose to pay with a credit card.

As discussed above, during the trial period, the referral service may allocate both a merchant and a fee portion of the payment to the merchant.

Furthermore, the referral service may send a delivery agent an indication that the food items should be picked up from the merchant and delivered to the user/delivery location. As discussed above, the delivery agent may retrieve the food items from the restaurant and then deliver the food items to the delivery location. In some implementations the delivery agent may also collect a payment from the user.

After the payment has been collected, either by the referral service or the delivery agent, both the fee portion and the merchant portion may be provided to the restaurant.

At the end of the free trial period, the referral service may inquire with the restaurant to determine if the restaurant (e.g., owners and/or managers) desires to continue using the referral service and may provide the restaurant with collected information regarding the type and amount of orders placed through the referral service during the free trial period. If the restaurant desires to continue using the referral service, the free trial mode may be ended and a membership mode may be enabled. As discussed above, in the membership mode, the referral service may collect the fee portion of payments received rather than providing the fee portion to the merchant.

If the restaurant does not desire to continue using the referral service, the restaurant may be questioned regarding its reasons and/or suggestions. In some implementations, the restaurant's comments and/or suggestions may be used to modify the referral service. In some implementations, the restaurant may be given a number of free trial periods.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

Embodiments

A. A method comprising: selecting a merchant from a plurality of merchants; enabling a trial mode for the merchant; during the trial mode, receiving an indication of a first order for the merchant; forwarding the indication of the first order to the merchant; allocating a first payment for the first order to the merchant; and requesting an acceptance of a membership status from the merchant.

A.1 The method of A, further comprising: receiving the acceptance of the membership from the merchant; disabling the trial mode for the merchant; and enabling a membership mode for the merchant.

A.1.1. The method of A.1, further comprising: during the membership mode, receiving an indication of a second order for the merchant; forwarding the indication of the second order to the merchant; and allocating a merchant portion of a second payment for the second order to the merchant.

A.1.1.1. The method of A.1.1, further comprising: collecting a fee portion of the second payment for the second order.

A.2. The method of A, further comprising: extending the trial mode if the acceptance is not received from the merchant.

A.2.1. The method of A.2, in which extending the trial mode includes extending the trial mode by at least one of a predetermined number of total orders, a predetermined total sales amount made for the merchant, and a predetermined amount of time.

A.2.2. The method of A.2, further comprising: transmitting an indication of an inquiry regarding a desire for an extension of the trial mode.

A.2.2.1. The method of A.2.2, in which extending the trial mode includes extending the trial mode after receiving an indication of a positive response to the inquiry.

A.2.2.1.1. The method of A.2.2.1, further comprising: transmitting at least one second indication of the request to change the trial status to the merchant if no response is received to the transmission of the first indication of the request within a predetermined period of time.

A.2.2.1.2. The method of A.2.2.1, further comprising: disabling the trial mode for the merchant if no response is received to the transmission of the first indication of the request within a predetermined period of time.

A.3. The method of A, further comprising: receiving an indication of a response to the request for acceptance.

A.3.1. The method of A.3, in which receiving the indication of the response includes receiving at least one electronic message.

A.3.1.1. The method of A.3.1, in which the at least one electronic message includes at least one of an SMS message, an MMS message, a database message, an email, a facsimile transmission, and an HTTP message.

A.3.2. The method of A.3, further comprising transmitting an inquiry includes regarding a reason for a rejection if the response includes a rejection to the request.

A.3.2.1. The method of A.3.2, further comprising: receiving an indication of the reason for the rejection; and adjusting at least one parameter of the method in accordance with the reason.

A.3.2.1.1. The method of A.3.2.1, in which the at least one parameter includes at least one of an information collection parameter, an information reporting parameter, a pricing parameter, a timing parameter, an order transmittal parameter, and a payment transmittal parameter.

A.3.2.2. The method of A.3.2, in which the at least one inquiry is performed by at least one of a person, and an automated system.

A.4. The method of A, in which the trial mode is enabled for at least one of a predetermined amount of time, a predetermined number of total orders transmitted to the merchant, and a predetermined total sales amount made for the first merchant.

A.5. The method of A, in which the indication of the first order is received from a user of at least one user interface.

A.5.1. The method of A.5, in which the at least one user interface includes at least one website.

A.5.2. The method of A.5, in which the at least one user interface includes at least one mobile device interface.

A.6. The method of A, in which the merchant includes a service provider.

A.6.1. The method of A.6, in which the first order includes an order to perform at least one service.

A.7. The method of A, in which the first order includes an order for at least one product.

A.7.1. The method of A.7, further comprising: delivering the product from the merchant to at least one customer.

A.7.1.1. The method of A.7.1, in which the indication of the first order is received from the at least one customer.

A.7.2. The method of A.7, further comprising: transmitting an indication of a request to deliver the product from the merchant to at least one customer.

A.7.2.1. The method of A.7.2, in which the indication of the first order is received from the at least one customer.

A.7.2.2. The method of A.7.2, in which the indication of the request is transmitted to at least one delivery agent.

A.8. The method of A, in which receiving the indication of the first order includes receiving at least one electronic message.

A.8.1. The method of A.8, in which the at least one electronic message includes at least one of an SMS message, an MMS message, a database message, an email, a facsimile transmission, and an HTTP message.

A.9. The method of A, further comprising: receiving an indication of the payment for the first order.

A.9.1. The method of A.9, in which receiving the indication of the payment for the first order includes receiving at least one electronic message.

A.9.1.1. The method of A.9.1, in which the at least one electronic message includes at least one of an SMS message, an MMS message, a database message, an email, a facsimile transmission, and an HTTP message.

A.9.2. The method of A.9, in which the indication of the payment for the first order and the indication of the first order are received in one electronic message.

A.9.2.1. The method of A.9.2, in which the one electronic message includes at least one of an SMS message, an MMS message, a database message, an email, a facsimile transmission, and an HTTP message.

A.9.3. The method of A.9, in which the indication of the payment for the first order is received from a financial institution.

A.9.3.1. The method of A.9.3, in which the financial institution includes at least one of a credit card company, a bank, and a money transmitter.

A.9.3.2. The method of A.9.3, in which the indication of the order is received from a user of a user interface.

A.9.4. The method of A.9, in which the indication of the first payment includes information identifying a transfer of money to a desired location.

A.9.4. The method of A.9, in which the desired location includes a money account of a financial institution.

A.9.4.1. The method of A.9.4, in which the money account includes at least one of a bank account, and a money transmitter account.

A.9.4.2. The method of A.9.4, further comprising: receiving the money at the desired location.

A.9.4.3. The method of A.9.4, in which the indication of the first payment is received from a financial institution transferring the money.

A.9.4.4. The method of A.9.4, in which the indication of the first payment is received from a financial institution receiving the money.

A.9.4.5. The method of A.9.4, in which the transfer includes a completed transfer.

A.9.4.6. The method of A.9.4, in which the transfer includes a future transfer.

A.9.5. The method of A.9, in which the indication of the first payment includes a promise to make the payment.

A.9.5.1. The method of A.9.5, in which the promise includes a promise to transfer money to a desired money account.

A.9.5.2. The method of A.9.5, in which the promise includes a promise to provide money to a desired person.

A.9.5.2.1. The method of A.9.5.2, in which the desired person includes one of the merchant and an agent of the merchant.

A.9.5.2.1.1. The method of A.9.5.2.1, further comprising: receiving at least a fee portion of the first payment.

A.9.5.2.1.1.1. The method of A.9.5.2.1.1, wherein the at least the fee portion of the first payment is received from the merchant after the one of the merchant and the agent of the merchant receives the first payment.

A.9.5.2.2. The method of A.9.5.2, in which the desired person includes a delivery agent.

A.9.5.2.2.1. The method of A.9.5.2.2, further comprising: receiving the first payment; and providing the first payment to the merchant.

A.9.6. The method of A.9, further comprising: receiving the first payment.

A.9.6.1. The method of A.9.6, further comprising: providing the first payment to the merchant.

A.10. The method of A, further comprising: providing a user interface to a user through which the user may enter the first order.

A.10.1. The method of A.10, in which the user interface includes at least one website.

A.10.2. The method of A.10, in which the user may enter information authorizing the first payment for the first order through the user interface.

A.10.2.1. The method of A.10.2, in which the information authorizing the first payment includes at least one of credit card information, debit card information, and checking account information.

A.11. The method of A, in which forwarding the indication of the first order includes transmitting at least one electronic message.

A.11.1. The method of A.11, in which the at least one electronic message includes at least one of an SMS message, an MMS message, a database message, an email, a facsimile transmission, and an HTTP message.

A.12. The method of A, further comprising: receiving a first plurality of first additional indications during the trial mode, each first additional indication of the first plurality of first additional indications indicating a respective first additional order; forwarding the first plurality of first additional indications to the merchant; and allocating a plurality of additional payments to the merchant.

A.12.1. The method of A.12, further comprising: collecting information regarding the first order and each first additional order indicated by at least one of the first plurality of first additional indications.

A.12.1.1. The method of A.12.1, in which the information includes at least one of a number of orders, a monetary value of orders, and a frequency of orders.

A.12.1.2. The method of A.12.1, further comprising: transmitting an indication of at least a portion of the information to the merchant.

A.13. The method of A, in which the merchant is selected based, at least in part, on an expansion plan.

A.13.1. The method of A.13, in which the expansion plan includes at least one of a geographic expansion plan, a cuisine expansion plan, and a market expansion plan.

A.13.1.1. The method of A.13.1, in which the geographic expansion plan identifies the merchant based on a geographic area in which the merchant is located.

A.13.1.1.1. The method of A.13.1.1, in which the geographic area does not including a large number of additional merchants for which the trial mode has been enabled and for which a membership mode has been enabled.

A.13.1.1.2. The method of A.13.1.1, in which the cuisine expansion plan identifies the merchant for assignment of the trial status based on a cuisine type of the merchant.

A.13.1.1.2.1. The method of A.13.1.1.2, in which the cuisine type is not associated with a large number of additional merchants for which the trial mode has been enabled and for which a membership mode has been enabled.

A.13.1.1.2. The method of A.13.1.1, in which the market expansion plan identifies the merchant based on at least one of a profit, a revenue, an order volume, and a capacity of the merchant.

A.13.2. The method of A.13, further comprising: receiving an indication of a request to enable the trial mode from the merchant.

A.13.2.1. The method of A.13.2, in which the trial mode is enabled in response to the indication of the request to enable the trial mode.

A.13.2.1.1. The method of A.13.2.1, in which the trial mode is enabled based, at least in part, on an expansion plan.

A.13.3. The method of A.13, in which the trial mode is enabled not in response to a request from the merchant to enable the trial mode.

A.14. The method of A, in which the indication of the first order is received from an order collector.

A.14.1. The method of A.14, in which the order collector includes at least one computer system.

A.14.1.1. The method of A.14.1, in which the at least one computer system provides at least one customer with at least one user interface through which information regarding the indication of the order.

A.15. The method of A, in which the first payment includes a fee portion and a merchant portion.

A.15.1. The method of A.15, in which the fee portion includes a fee for performing the method.

A.15.1.1. The method of A.15.1, further comprising: collecting the fee portion and the merchant portion.

A.15.1.1.1. The method of A.15.1.1, further comprising: providing the merchant portion and the fee portion to the merchant.

A.15.2. The method of A.15, further comprising: displaying an indication of a fee total to a customer, the fee total including the merchant portion and the fee portion.

A.16. An apparatus comprising: a machine readable medium having stored thereon a plurality of machine instructions for controlling at least one computer system to perform a method according to A.

A.16.1. The apparatus of A.16, further comprising: a processor configured to execute at least one instruction of the plurality of machine instructions.

B. An apparatus comprising: a first element configured to receive an indication of a first order for a merchant during a trial mode, forward the indication of the first order to the merchant, and requesting an acceptance of a membership status from the merchant; and a second element configured to select the merchant from a plurality of merchants, enable the trial mode for the merchant, and allocate a first payment for the first order to the merchant.

C. A method comprising: receiving an indication of an order; receiving an indication of a payment for the order; transmitting the indication of the order to a merchant; and allocating at least a merchant portion of the payment to the merchant based, at least in part, on a trial status of the merchant.

C.1. The method of C, further comprising: receiving a first plurality of first additional indications, each first additional indication of the first plurality of first additional indications indicating a respective first additional order, receiving a second plurality of second additional indications, each second additional indication of the second plurality of second additional indications indicating a respective additional payment associated with at least one additional order indicated by at least one of the first plurality of first additional indications; transmitting the first plurality of additional indications to the merchant; and allocating at least an additional merchant portion of each additional payment indicated by each second additional indication of the second plurality of second additional indications to the merchant based, at least in part, on the trial status of the merchant.

D. A method comprising: receiving an indication of an order for a merchant; determining a trial status of the merchant; and determining an allocation of a payment for the order based, at least in part, on the trial status.

E. An apparatus comprising: a first element configured to receive an indication of an order, receive an indication of a payment for the order, and transmit the indication of the order to a merchant; and a second element configured to allocate at least a merchant portion of the payment to the merchant based, at least in part, on a trial status of the merchant.

E.1. The apparatus of E, in which the first element is configured to receive a first plurality of first additional indications, each first additional indication of the first plurality of first additional indications indicating a respective first additional order, is configured to receive a second plurality of second additional indications, each second additional indication of the second plurality of second additional indications indicating a respective additional payment associated with at least one additional order indicated by at least one of the first plurality of first additional indications, and is configured to transmit the first plurality of additional indications to the merchant; and the second element is configured to allocate at least an additional merchant portion of each additional payment indicated by each second additional indication of the second plurality of second additional indications to the merchant based, at least in part, on the trial status of the merchant.

F. An apparatus comprising: a first element configured to receiving an indication of an order for a merchant; a second element configured to determine a status of the merchant, and determine an allocation of a payment for the order based, at least in part, on the status.

F.1. The apparatus of F, in which the first element is configured to receive a first plurality of first additional indications, each first additional indication of the first plurality of first additional indications indicating a respective first additional order; and the second element is configured to determine a plurality of additional allocations of a plurality of additional payments based, at least in part, on the trial status.

What is claimed is:

1. A method comprising:
    assigning, by a computer system configured to provide order referrals, a trial mode of a referral service to a merchant based at least in part on an expansion plan for the referral service, in which the merchant offers for sale at least one of a good and a service;
    enabling, by a processor of the computer system, the trial mode for the merchant;
    during the trial mode, receiving, by the computer system, an indication of a first order for the merchant from a remote device;
    forwarding, by the computer system, the indication of the first order to the merchant;
    allocating, by the computer system, a first payment for the first order to the merchant; and
    transmitting a request for acceptance of a membership status to the merchant.

2. The method of claim 1, further comprising:
    receiving the acceptance of the membership from the merchant;
    disabling the trial mode for the merchant; and
    enabling a membership mode for the merchant.

3. The method of claim 2, further comprising:
    during the membership mode, receiving an indication of a second order for the merchant;
    forwarding the indication of the second order to the merchant; and
    allocating a merchant portion of a second payment for the second order to the merchant.

4. The method of claim 3, further comprising: collecting a fee portion of the second payment for the second order.

5. An apparatus comprising: a machine readable medium having stored thereon a plurality of machine instructions for controlling at least one computer system configured to provide order referrals to perform a method comprising:
    assigning, by the computer system configured to provide order referrals, a trial mode of a referral service to a merchant based on an expansion plan for the referral service, in which the merchant offers for sale at least one of a good and a service;
    enabling, by a processor of the computer system, the trial mode for the merchant;

during the trial mode, receiving, by the computer system, an indication of a first order for the merchant from a remote device;

forwarding, by the computer system, the indication of the first order to the merchant;

allocating, by the computer system, a first payment for the first order to the merchant; and transmitting a request for acceptance of a membership status to the merchant.

6. The apparatus of claim 5, further comprising: a processor configured to execute at least one instruction of the plurality of machine instructions.

7. A method comprising:

assigning, by a computer system configured to provide order referrals to merchants, a trial mode of a referral service to a merchant based at least in part on an expansion plan for the referral service, in which the merchant offers for sale at least one of a good and a service;

receiving, by the computer system, an indication of prices of each of a plurality of goods or services offered by the merchant to walk-in customers of the merchant;

providing, by the computer system, an indication of the prices to at least one remote device;

receiving, by the computer system, an indication of an order for the merchant of at least one of the plurality of goods and the services from the at least one remote device;

receiving, by the computer system, an indication of a payment of the price of the at least one of the plurality of goods and services;

transmitting, by the computer system, the indication of the order to the respective merchant; and allocating, by a processor of the computer system, at least a merchant portion of the payment to the respective merchant based, at least in part, on whether the trial mode is active with respect to the referral service.

8. The method of claim 7, in which if the trial mode is active, allocating includes allocating the merchant portion and a fee portion to the merchant; and if the trial mode is not active, allocating includes allocating the merchant portion to the merchant and allocating the fee portion to the referral service.

9. An apparatus comprising: a machine readable medium having stored thereon a plurality of machine instructions for controlling at least one computer system configured to provide order referrals to perform a method comprising:

assigning, by the computer system, a trial mode of a referral service to a merchant based at least in part on an expansion plan for the referral service, in which the merchant offers for sale at least one of a good and a service;

receiving, by the computer system, an indication of prices of each of a plurality of goods or services offered by the merchant to walk-in customers of the merchant;

providing, by the computer system, an indication of the prices to at least one remote device;

receiving, by the computer system, an indication of an order for the merchant of at least one of the plurality of goods and the services from the at least one remote device;

receiving, by the computer system, an indication of a payment of the price of the at least one of the plurality of goods and services;

transmitting, by the computer system, the indication of the order to the respective merchant; and allocating, by a processor of the computer system, at least a merchant portion of the payment to the respective merchant based, at least in part, on whether the trial mode is active with respect to the referral service.

10. The apparatus of claim 9, further comprising: a processor configured to execute at least one instruction of the plurality of machine instructions.

11. The method of claim 7, in which-the indication of the order and the indication of the payment are received from an order collector.

* * * * *